United States Patent [19]
Masuda et al.

[11] 3,944,294
[45] Mar. 16, 1976

[54] COMBINED LOAD-SENSING PROPORTION AND RELAY VALVE FOR AN AIR BRAKE SYSTEM

[75] Inventors: Naosuke Masuda; Itiro Yanagawa, both of Higashimatsuyama, Japan

[73] Assignee: Jidosha Kiki Co., Ltd., Tokyo, Japan

[22] Filed: May 10, 1974

[21] Appl. No.: 469,006

[30] Foreign Application Priority Data
June 8, 1973  Japan.............................. 48-64465
Nov. 28, 1973  Japan............................ 48-133264

[52] U.S. Cl.................. 303/40; 303/22 R; 137/85; 137/596.18; 137/627.5
[51] Int. Cl.²................ F16K 31/12; F15B 13/042
[58] Field of Search....... 137/596.18, 627.5, 596.14, 137/630, 625, 25, 625.27; 251/77, 63.5, 63.6, 63.4, 62; 303/50, 52, 40, 22 R; 92/62, 63, 65; 91/167

[56] References Cited
UNITED STATES PATENTS
3,252,471  5/1966  Olson.......................... 137/627.5 X
3,712,340  1/1973  Deem.............................. 137/627.5
3,788,350  1/1974  West.............................. 137/596.18

*Primary Examiner*—Martin P. Schwadron
*Assistant Examiner*—Robert J. Miller
*Attorney, Agent, or Firm*—Toren, McGeady and Stanger

[57] ABSTRACT

A combined load-sensing proportion and relay valve for an air brake system, comprising a valve disk having an exhaust hole in the axial center, and a control piston assembly for adjustably moving the valve disk to open the valve, characterized in that the control piston assembly consists of two pressure-sensitive pistons, the first of the pistons being formed with a downward projection having a valve seat at its lower end for face-to-face engagement with the valve seat, an indicated-pressure chamber communicated with an indicated-pressure inlet port is formed between the upper side of the first pressure-sensitive piston and the underside of the second piston, a control-pressure chamber communicated with a control-pressure inlet port is provided above the second pressure-sensitive piston, and engaging means is located between the first and second pistons.

8 Claims, 8 Drawing Figures

COMBINED LOAD-SENSING PROPORTION AND RELAY VALVE FOR AN AIR BRAKE SYSTEM

This invention relates to improvements of a relay valve for installation in an air brake system for a motor vehicle, and more specifically to a relay valve for an air brake system capable of adjusting the braking pressure according to the payload of the vehicle.

Heavy duty vehicles, such as buses, trucks, and trailer-trucks, are subjected to highly variable loads on their wheels, depending on whether the vehicles are laden or not, and also to a substantially variable load distribution ratio between the front and rear wheels on braking and deceleration. With these vehicles it is important to allocate the braking force optimumly to the wheels in order to avoid premature locking of a specific wheel or wheels when the brake is applied, and thereby ensure the safety of the vehicles at the time of braking.

The vehicles equipped with service brake systems of a type such that the operator controls the brake valve by a foot-pedal operation so that compressed air from an air reservoir is supplied as braking pressure to a brake actuator or actuators, usually meet the foregoing requirement by the use of regulating means generally known as a load-sensing proportion valve. The valve, installed between the brake valve and a relay valve, senses the payload of the vehicle in terms of the distance between the upper and lower end surfaces of a suspension spring or springs, regulates the indicated pressure from the brake valve on the basis of the value so sensed, and then transmits the regulated indicated pressure to the relay valve.

In the operation of conventional air brake systems, the hystereses of the load-sensing proportion valves and the relay valves are added to each other, and therefore the brake actuators fail to work in perfectly exact and accurate response to the indicated pressure for braking. In addition, when an ordinary vehicle runs over a rough road or its wheels encounter irregularities in the road, the top-to-bottom distance of its suspension varies vibratingly. To avoid this variation, oil dampers must be installed.

Moreover, because the indicated-pressure lines of the existing air brake systems include load-sensing proportion valves and relay valves as noted above, no small quantities of compressed air are retained in the lines. The retention of such large quantities of compressible fluid medium means slow responses of the brake actuators at the terminals of the brake circuits.

It is therefore an object of the present invention to provide a valve that combines the functions of a load-sensing proportion valve and a relay valve, the two components usually constituting the indicated-pressure system of an air brake circuit, so as to produce an indicated-pressure system compact in construction.

Another object of the invention is to provide a relay valve with a minimum of hysteresis and little variation in the braking force. The combination of the two existing valves confines the overall hysteresis of the system to that of the relay valve alone. The valve according to the invention is also capable of restricting the variation of the braking force in an easy and inexpensive way without using any oil damper.

A further object of the invention is to provide a relay valve quick in transmission of each braking instruction and ready in response for braking action. This is made possible by the structure of the valve which combines an ordinary load-sensing proportion valve and a relay valve and allows an accordingly reduced quantity of air to be retained in the indicated-pressure system.

These objects are realized by the relay valve of the invention with the following construction.

In one aspect, the combined load-sensing proportion and relay valve according to the invention comprises a valve disk having an exhaust hole in the axial center and so located as to keep the valve normally closed, and a control piston assembly arranged coaxially with the valve disk to move the disk adjustably to open the valve. The control piston assembly has two pressure-sensitive pistons. The first piston has a downward projection at the center of its underside, formed with a valve seat at its lower end for face-to-face engagement with the valve disk. Between the upper side of the first pressure-sensitive piston and the underside of the second piston is defined an indicated-pressure chamber or a space that is subjected to the action of an indicated pressure introduced therein through an inlet port. Above the second piston is formed a control-pressure chamber that is subjected to the action of a control pressure received through an inlet port. The two pressure-sensitive pistons are engaged in such a manner that, as the indicated pressure becomes higher than the control pressure and therefore the second piston ascends, the second piston pulls or pushes up the first one, too.

In another aspect, the combined load-sensing proportion and relay valve according to the invention comprises a valve disk having an exhaust hole in the axial center and so located as to keep the valve normally closed, and a control piston assembly arranged coaxially with the valve disk to move the disk adjustably to open the valve. The control valve assembly has two pressure-sensitive pistons. The first piston has a downward projection formed with a valve seat at its lower end for face-to-face engagement with the valve disk and also has an upward projection expanded at the upper end. The second piston has at the center of its upper side a small chamber for receiving the upward projection of the first piston. To prevent the expanded head of the upward projection from dropping off from the small chamber of the second piston, stopper means is provided in the vicinity of the entrance of the small chamber, so that the two pressure-sensitive pistons are operatively connected to each other. Between the upper side of the first pressure-sensitive piston and the underside of the second piston is provided an indicated-pressure chamber that is subjected to the action of an indicated pressure admitted thereto through an inlet port. Above the second piston is formed a control-pressure chamber to be subjected to a control pressure received through an inlet port. The two pistons are engaged in such a manner that, as the indicated pressure exceeds the control pressure and hence the second piston is raised, the second piston pulls up the first piston, too.

Other objects and advantages of the invention will become apparent from the following description taken in conjunction with the accompanying drawings showing embodiments thereof, wherein.

Figure 1:
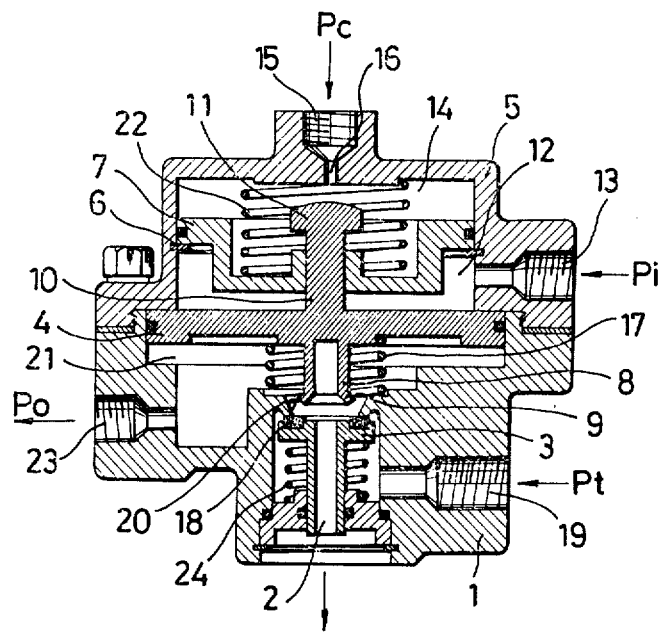
FIG. 1 is a vertical sectional view of a relay valve embodying the invention.

Referring now to the drawings, specifically to FIG. 1, there is shown the construction of a typical relay valve according to the invention. The valve body 1 accommodates a valve disk 3 having an exhaust hole 2 in the axial center, and a first pressure-sensitive piston 4. A valve bonnet 5, faucet-jointed to the valve body 1, supports a second pressure-sensitive piston 7 opposite to the first one 4. The piston 7 is limited in its movement by a stopper ring 6. The first pressure-sensitive piston 4 is formed with a hollow, downward projection 8 at the center of its underside, the lower end of the projection constituting a valve seat 9 for contact with the valve disk 3. A solid upward projection 10 is formed on the upper center of the piston 4. The projection 10 extends through the second piston 7, and a stopper 11 formed at its upper end is adapted to engage the piston 7.

Between the first and second pressure-sensitive pistons is defined an indicated-pressure chamber 12, in such a manner that an indicated pressure introduced through a port 13 into the chamber forces the first piston 4 downward and the second piston 7 upward. On the other hand, a control-pressure chamber 14 formed between the upper side of the second piston 7 and the inner wall of the valve bonnet 5 receives a control pressure by way of a control-pressure port 15, so that the second piston can be forced downward. The control-pressure port 15 is communicated with the chamber 14 through an orifice 16, which prevents the direct conduction of any sharp change in the control pressure into the control-pressure chamber. The numeral 17 designates a spring 18 a valve seat, 19 a supply-pressure port, 20 a valve seat, 21 an output-pressure chamber, 22 a spring, 23 an output-pressure port, and 24 a spring.

The relay valve made up of the foregoing components operates in the manner now to be described.

Figure 2:
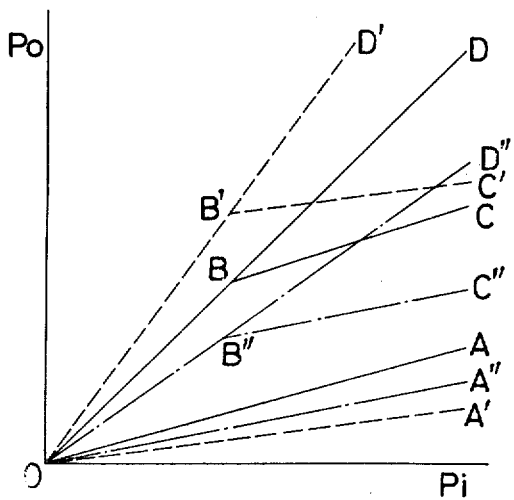
FIG. 2 is a graph showing the characteristic relationship between the indicated pressure and output pressure of the relay valve.

If the control pressure Pc applied to the control-pressure chamber 14 is greater than the indicated pressure Pi in the indicated-pressure chamber 12, the latter pressure will simply reduce the downward force on the second pressure-sensitive piston 7, while allowing the piston to be stationary in contact with the stopper ring 6. Therefore, the first-pressure-sensitive piston 4 will remain unaffected. As the indicated pressure Pi increases, the first piston 4 is forced downward against the spring 17 until the valve seat 9 at the lower end of the downward projection 8 comes into contact with the valve seat 18 of the valve disk 3, closing the exhaust hole 2 and moving the valve disk 3 to open the valve. Compressed air Pt is then admitted from the supply-pressure port 19 through the space between the valve seats 18 and 20 into the output-pressure chamber 21, giving birth to an output pressure Po therein. The output pressure exerts an upward force on the underside of the first pressure-sensitive piston 4 and thereby moves the piston to the point where the upward force is balanced with the downward force generated by the indicated pressure Pi. The relation between the indicated pressure Pi and the output pressure Po in this case is represented by the characteristic line section O-B in FIG. 2. The gradient of the line O-B can be changed as desired, for example, to O-B' or O-B'' by varying the ratio of the surface area of the first pressure-sensitive piston 4 facing the indicated-pressure chamber to that of the piston facing the output-pressure chamber.

Conversely if the indicated pressure Pi surpasses the control pressure Pc, then the second pressure-sensitive piston 7 will move upward against the spring 22 until it strikes the stopper 11 at the top of the upward projection 10 of the first pressure-sensitive piston 4. In this way much of the downward force of the first piston 4 is counteracted by the upward force to which the second piston 7 is subjected. In other words, the increment of the indicated pressure Pi, in effect, acts on the differential between the surface areas of the first and second pistons facing the indicated-pressure chamber. Consequently, the increment of the output pressure Po is smaller than when the control pressure Pc is higher than the indicated pressure. This relation between the indicated pressure Pi and the output pressure Po is represented by the line B-C in FIG. 2. As in the previous case, the gradient of the line B-C can be freely changed, for example, to B'-C', B''-C'', too, by varying the ratio of the difference between the surface areas of the first and second pistons facing the indicated-pressure chamber to the area of the first piston facing the output-pressure chamber.

The point B can be changed as desired with respect to the same control pressure by varying the ratio of the surface area of the second pressure-sensitive piston 7 facing the control-pressure chamber to that of the same piston facing the indicated-pressure chamber. It is also possible to move the point B to any other point on the line O-D by varying the control pressure Pc. In order to attain a damper effect that minimizes the influence of disturbance, for example, the orifice 16 is provided for the inlet port 15 for the control pressure as shown in FIG. 1. Provision of such a restrictor means at a suitable point of the control-pressure system is effective for the purpose.

Figure 3:
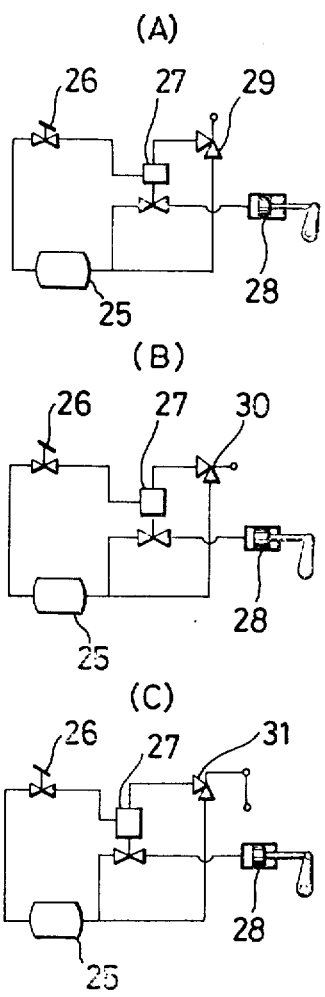
FIG. 3 shows schematic diagrams of three exemplary air brake circuits each of which incorporates a relay valve according to the invention.

FIG. 3 shows schematic diagrams (A) through (C) of air brake circuits each of which incorporates a combined load-sensing proportion and relay valve according to the present invention. In the diagram (A), a push-pull valve usually employed for air brakes is adopted for the pressure control of the control-pressure system. An indicated pressure Pi from an air reservoir 25 is led via a brake valve 26 to the indicated-pressure port of a relay valve 27 according to the invention. Meanwhile, a control pressure Pc flows from the air reservoir 25 through a push-pull valve 29 into the control-pressure port of the relay valve 27. At the same time, a service brake pressure flows from the air reservoir 25 to the relay valve 27 for pressure regulation and thence into a brake actuator 28. The characteristics of this circuit are represented by the lines O-A, O-A', O-A'' or the lines O-D, O-D', O-D'' in FIG. 2.

The diagram (B) is of another generally employed circuit for controlling. The numeral 30 indicates a hand-operated brake valve. This circuit is featured by the ability of changing the point B in FIG. 2.

The diagram (C) shows still another brake circuit using, in its control-pressure system, a valve 31 designed to control through linkage a fluid-pressure control valve, such as the push-pull valve or hand-operated brake valve in the diagram (A) or (B), according to the payload on the vehicle. In this circuit, the front end of the linkage is usually engaged with the lower part of a suspension spring, and the valve 31 is installed at a suitable point of the car body, so that the control pressure can be automatically controlled according to the payload of the vehicle or depending on changes of the load.

Figure 4:
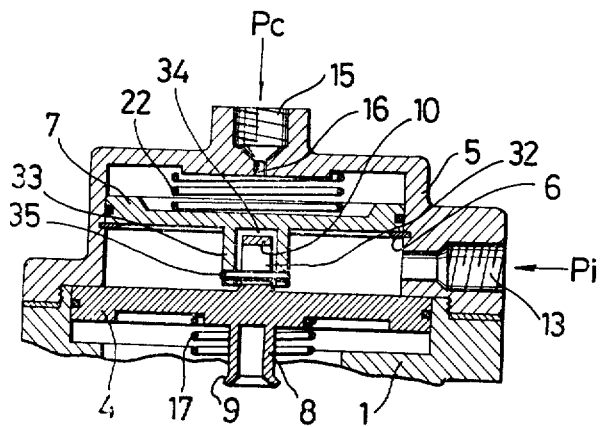
FIG. 4 is a fragmentary, vertical sectional view of another embodiment of the invention.

FIG. 4 shows another embodiment of the invention, in a fragmentary vertical section, wherein the first and second pressure-sensitive pistons 4, 7 are engaged with each other by means of a slot and a connecting pin. The upward projection 10 of the first pressure-sensitive piston 4 has a slot 32, while the downward projection 33 of the second piston 7 has a cavity 34 large enough to accommodate the upward projection 10 and carries at its lower end a connecting pin 35, which is extended through the slot 32. When the indicated pressure is higher than the control pressure, the second piston 7 is pushed upward by the indicated pressure, thus pulling up the first piston 4, too, with the connecting pin 35.

Figure 5:
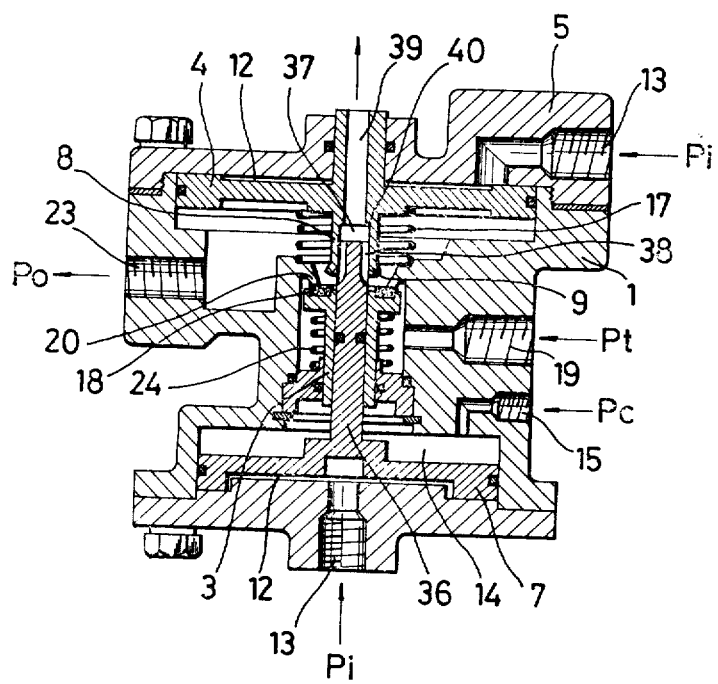
FIG. 5 is a vertical sectional view of still another embodiment of the invention.

FIG. 5 is a vertical section through yet another embodiment of the invention, in which the first and second pressure-sensitive pistons 4, 7 are separately located above and below and on the opposite sides of the valve disk 3. The upper projection 36 of the second piston 7 extends through the center opening of the valve disk 3 into an opening 37 of the downward projection 8 of the first piston 4.

When the control pressure Pc is higher than the indicated pressure Pi, the latter enters indicated-pressure chambers 12 through inlet ports 13 and forces the first pressure-sensitive piston 4 downward against the spring 17, while the second piston 7 is in its lower position under the control pressure Pc. Thus the lower end 9 of the downward projection 8 moves the valve disk 3, opening the valve, so that the service brake pressure Pt from the supply-pressure port 19 is conducted to brake actuators not shown via the output-pressure port 23. As the indicated pressure Pi dies down, the first piston 4 is urged upward by the spring 17 and, at the same time, the valve disk 3 is raised by the spring 24 to close the valve. The compressed air, which is otherwise led toward the output-pressure port, is released through flutes 38 formed at the upper end of the upward projection 36 of the second piston and through an exhaust hole 39 formed in the axial center of the first piston.

When the indicated pressure Pi is higher than the control pressure Pc, the upward forces that act on the indicated-pressure chambers 12 exceed the downward force that acts on the control-pressure chamber 14. Consequently, the second pressure-sensitive piston 7 ascends until the upper end of its upward projection 36 strikes a shoulder 40 formed around the opening 37 of the first piston 4, whereby the first piston is pushed up by the second piston.

While the first pressure-sensitive pistons 4 in the embodiments shown in FIGS. 1 and 4 are raised by the second pistons with the aid of stopper means, the second piston in this third embodiment forces up the first piston at its shoulder 40. Excepting this, the embodiment is the same in construction and operation as the two other embodiments, and therefore the explanation of other details is omitted. It should be clear to those skilled in the art that this and other modifications or variations are possible without departing from the spirit and scope of the appended claims.

Figure 6:
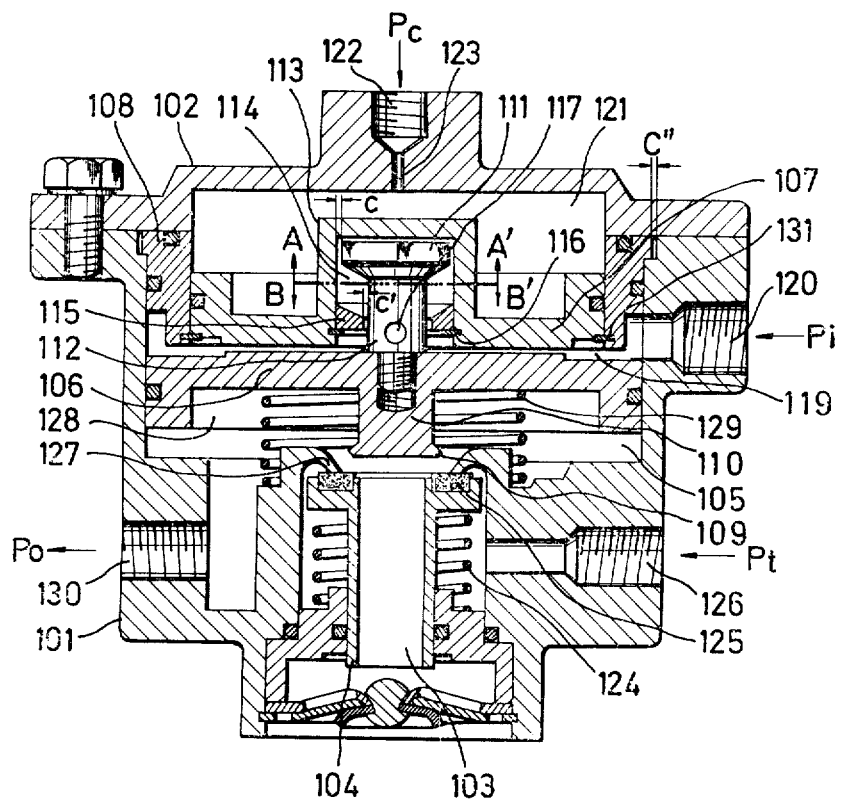
FIG. 6 is a vertical sectional view of yet another embodiment of the invention.

FIG. 6 shows still another form of relay valve according to the invention. Its valve body 101 and cover 102 are airtightly fastened together by bolts and nuts. The valve body 101 accommodates in its lower part a valve disk 104 having an exhaust hole 103 in the axial center, and in its upper part above the valve disk, or in a chamber 105 inside the valve body 101, a control piston assembly for adjustably moving the valve disk and opening the valve. The control piston assembly comprises a first pressure-sensitive piston 106, a second pressure-sensitive piston 107, and a bush 108 slidably supporting the second piston. The first piston 106 has a downward projection 110 which is so shaped at its lower end as to serve as a valve seat 109 for face-to-face contact with the valve disk 104. Also the piston has an upward projection 112 which is expanded at its upper end 111 to serve as a stopper. The second piston 107 is formed with an upper center boss 113 having a small chamber 114 to accommodate the expanded head 111 of the first piston. A stopper washer 115 is provided to keep the head 111 from dropping off from the small chamber 114. The stopper washer 115 is supported by a snap ring 116. The upward projection 112 of the first piston 106 is formed with a hole 117 to receive a lever by which the projection member is screwed into the piston body. The first and second pistons 106, 107 are engaged with each other by the expanded head 111, stopper washer 115, and snap ring 116.

Between the first and second pressure-sensitive pistons 106, 107 is formed an indicated-pressure chamber 119, into which an indicated pressure is introduced through an inlet port 120 to force the first piston 106 downward and the second piston 107 upward. On the other hand, a control pressure is admitted through an inlet port 122 to a control-pressure chamber 121 defined between the upper surface of the second piston and the inner wall of the cover 102, thus forcing down the second piston. The inlet port 122 is communicated with the control-pressure chamber 121 through an orifice 123, lest any sudden and vibratile pressure change which occur in the valve 31 shown in FIG. 3 (C), when a vehicle runs on a rough road, should be directly transmitted to the chamber. The numeral 124 indicates a spring for biasing the valve disk 104 upward, 125 a valve seat provided on the valve disk, 126 a supply-pressure inlet port, 127 a valve seat formed in the valve body, 128 an output-pressure chamber, 129 a spring for biasing the first piston 106 upward, and 130 an output-pressure outlet port.

The operation of the relay valve, with the construction described above, is as follows.

Assuming that the control pressure Pc applied to the control-pressure chamber 121 is higher than the indicated pressure Pi in the indicated-pressure chamber 119, the latter pressure will merely decrease the downward force on the second pressure-sensitive piston 107, while the piston is kept stationary in contact with a stopper ring 131. Consequently, the first pressure-sensitive piston 106 will remain unaffected. With an increase of the indicated pressure Pi, however, the first piston 106 is forced downward against the spring 129 until the valve seat 109 at the lower end of the downward projection 110 comes into contact with the valve seat 125, closing the exhaust hole 103 and moving the valve disk 104 to open the valve. The supply pressure Pt flows from the inlet 126 through the space between the two valve seats 125 and 127 into the output-pressure chamber 128, producing an output pressure Po therein. The output pressure imparts an upward force to the underside of the first piston 106 and causes the piston to stop at a point where the force is balanced with the downward force generated by the indicated pressure Pi. The relation between the indicated pressure Pi and the output pressure Po in this case is represented by the characteristic line section O-B in FIG. 2. The gradient of the line O-B can be changed as desired, for example, to O-B' or O-B'' by varying the ratio of the surface area of the first piston 106 facing the indicated-pressure chamber to that of the piston facing the output-pressure chamber.

If the indicated pressure Pi is higher than the control pressure Pc, then the second pressure-sensitive piston 107 will move upward until it strikes the expanded head 111 of the upward projection 112 of the first pressure-sensitive piston 106. Thus, much of the downward force of the first piston 106 is counteracted by the upward force for the second piston 107. The increment of the indicated pressure Pi, in effect, acts on the differential between the surface areas of the first and second pistons facing the indicated-pressure chamber. Consequently, the increment of the output pressure Po is smaller than when the control pressure Pc is higher than the indicated pressure. This relation between the indicated pressure Pi and the output pressure Po is represented by the line B-C in FIG. 2. The gradient of the line B-C can be freely changed, for example, to B'-C' or B''-C'', by varying the ratio of the difference between the surface areas of the first and second pistons facing the indicated-pressure chamber to the area of the first piston facing the output-pressure chamber.

The point B can be shifted as desired for the same control pressure by varying the ratio of the surface area of the second pressure-sensitive piston facing the control-pressure chamber to that of the same piston facing the indicated-pressure chamber. It is also possible to move the point B to any other point on the line O-D by varying the control pressure Pc. In order to achieve a damper effect that minimizes the influence of disturbance, for example, the orifice 123 is provided for the inlet port 122 for the control pressure as shown in FIG. 6. Such flow-passage restrictor means may be provided at a suitable point of the control-pressure system between the valve 31 and the relay valve 27 as shown in FIG. 3 (C).

As will be understood from the foregoing description, the relay valve shown in FIG. 6 is featured by the arrangement in which the first and second pressure-sensitive pistons 106, 107 are engaged with each other by means of the expanded head of the upward projection 112 which is screwed at the base into the first piston and also by means of the stopper washer 115 provided in the small chamber 114 of the second piston. To facilitate the fitting of the expanded head and the stopper washer in position, the embodiment shown in FIG. 6 may be variously modified or altered without departing from the spirit of the invention.

Figure 7:
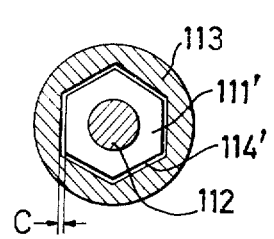
FIG. 7 is a transverse sectional view of an additional embodiment of the invention corresponding to the section along the line A—A' of FIG. 6 and as viewed in the direction of arrows.

FIG. 7 is a cross section through one of such modifications, comparable to the section taken along the line A-A' of FIG. 6 and viewed in the direction of the arrows. In the modified combination, an expanded head 111' of the upward projection of the first pressure-sensitive piston and a small chamber 114' enclosing the upper end portion with a clearance C therebetween are both hexagon shaped. Turning the second pressure-sensitive piston 107, therefore, screws the upward projection 112 into the body of the first piston 106. For this engagement between the two pistons, the lever hole 117 as formed in the embodiment of FIG. 6 is not required.

Figure 8:
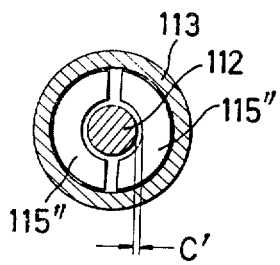
FIG. 8 is a transverse sectional view of a further embodiment corresponding to the section along the line B—B' of FIG. 6 and as viewed in the direction of arrows.

FIG. 8 is a section through another modification, comparable to the section taken along the line B-B' of FIG. 6 and viewed in the direction of the arrows. Here the upward projection 112 is formed in one piece with the first pressure-sensitive piston body. Therefore, the stopper washer 115'' must be split into two; otherwise it cannot be fitted over the stem of the protrusion under the expanded head 111. It should be obvious to those skilled in the art that these and other modifications are, of course, possible within the scope of the appended claims.

In each of the embodiments illustrated in FIGS. 6, 7, and 8 and described above, it is possible to provide suitable clearances C and C', respectively, between the periphery of the head of the first piston's upward projection and the inner wall of the small chamber on the second piston and between the periphery of the stem of the upward projection and the inner wall of the stopper washer. An additional clearance C'' may be provided between the inner periphery of the upper flange of the valve body and the outer periphery of the bush in the valve body. This means that no critical allowance is required for the dimensional accuracy and concentricity of the components constituting the control piston assembly.

As will be appreciated from the foregoing description, the relay valve according to the present invention can be made at low cost, with the valve mechanism, particularly the control piston unit, reduced in size and made compact in design. Moreover, the valve is safe and durable. With these advantages, the present invention is expected to contribute much to the improvement of the braking systems of large road vehicles.

What is claimed is:

1. A combined load sensing proportion and relay valve assembly for an air brake system comprising: means defining a flow path through said valve assembly between an inlet port and an outlet port, said flow path including an outlet pressure chamber; a main valve mechanism including a valve seat and a valve disc, said valve disc being biased into engagement with said valve seat to block said flow path; a first pressure-sensitive piston including means projecting from one side thereof for abutment with said valve disc to unseat said valve disc from said valve seat to effect opening of said flow path through said valve assembly; a second pressure-sensitive piston; engaging means extending between said first and second pistons to enable free relative movement therebetween within a limited range and causing said second piston to abut said first piston in opposition to movement of said first piston to unseat said valve disc when said pistons move relative to each other beyond said limited range; control-pressure chamber means having a control pressure therein acting against one side of said second piston to urge said second piston to move away from abutment through said engaging means with said first piston; stopper means for limiting the extent of movement of said second piston in response to said control pressure in said control pressure chamber means; indicated-pressure chamber means indicated pressure created therein upon actuation of said braking system, said indicated-pressure chamber means being configured to cause said indicated-pressure therein to act simultaneously against both said first and said second pistons, said indicated-pressure acting upon one side of said first piston to drive said first piston in a direction toward unseating of said valve disc and against one side of said second piston in opposition to said control pressure; and means for applying the pressure in said output pressure chamber against the side of said second piston opposite the side against which said indicated pressure is applied, with the pressure in said output pressure chamber being balanced against said indicated-pressure to open and close said valve assembly flow path in accordance with the control pressure developed in said control pressure chamber means.

2. A valve assembly according to claim 1, wherein said engaging means comprise a projection extending from said first pressure-sensitive piston in sealed sliding engagement through said second pressure-sensitive piston and having an enlarged portion formed on the end thereof for engagement with said second piston when said first and said second pistons move relative to each other beyond said limited range.

3. A valve assembly according to claim 1, wherein said control-pressure chamber means include a control-pressure inlet port communication with said control-pressure chamber means through an orifice.

4. A valve assembly according to claim 1 wherein said engaging means comprise an upward projection provided on said first pressure-sensitive piston and formed with a slot, a downward projection extending from the underside of said second pressure-sensitive piston and formed with a cavity having a dimension sufficiently large to accommodate said upward projection, and a connecting pin inserted through said slot and supported at both ends by said downward projection.

5. A valve assembly according to claim 1 wherein said valve disc has an upwardly directed exhaust hole in the axial center thereof with said valve seat encircling the upper end of said exhaust hole, said first piston being formed with a downward projection having a valve seat at its lower end for face-to-face engagement with the valve seat of said valve disc and also having a hole in the axial center thereof with a shoulder formed in the intermediate part of the opening and extended inwardly, said second piston being located under said valve disc, said upper projection extending through the valve disc into the hole engageably with the shoulder and formed with flutes on the upper part of said upward projection, said indicated-pressure chamber means including a first indicated-pressure chamber and a second indicated-pressure chamber, said first indicated-pressure chamber being defined between the upper side of said first piston and the inner wall of said valve body, said control pressure chamber means being formed above said second piston with said second indicated pressure chamber being defined between the underside of said second piston and the inner wall of said valve body.

6. A valve assembly according to claim 1 wherein said valve disc has an upwardly directed exhaust hole in the axial center thereof with said valve seat encircling the upper end of said exhaust hole, said first piston being formed with a downward projection having a valve seat at its lower end for face-to-face engagement with the valve seat on said valve disc and also having an upward projection expanded at the upper end thereof to form a head, said second piston being formed with a small chamber on the upper center thereof for receiving said upward projection, with means being provided in the vicinity of the entrance of said small chamber to prevent said expanded head of the upward projection of said first piston from dropping off from the small chamber of said second piston, said indicated pressure chamber means being defined between the upper side of said first piston and the underside of said second piston, and said control pressure chamber means being provided above said second piston.

7. A valve assembly according to claim 6 wherein said upward projection of said first piston is a separate member threadedly connected into an internal threaded hole of said piston and being polygonally shaped at said expanded head, said small chamber of said second piston being also polygonally shaped to receive said head.

8. An assembly according to claim 6 wherein said upward projection of said first piston is formed integrally with said first piston, said means for preventing the expanded head of said upward projection of said first piston from dropping off said small chamber of said second piston being a split-type stopper washer provided in the vicinity of the entrance of said small chamber.

* * * * *